Sept. 13, 1927.  W. C. HART  1,642,068
PRINTING ROLLER
Filed Feb. 26, 1924
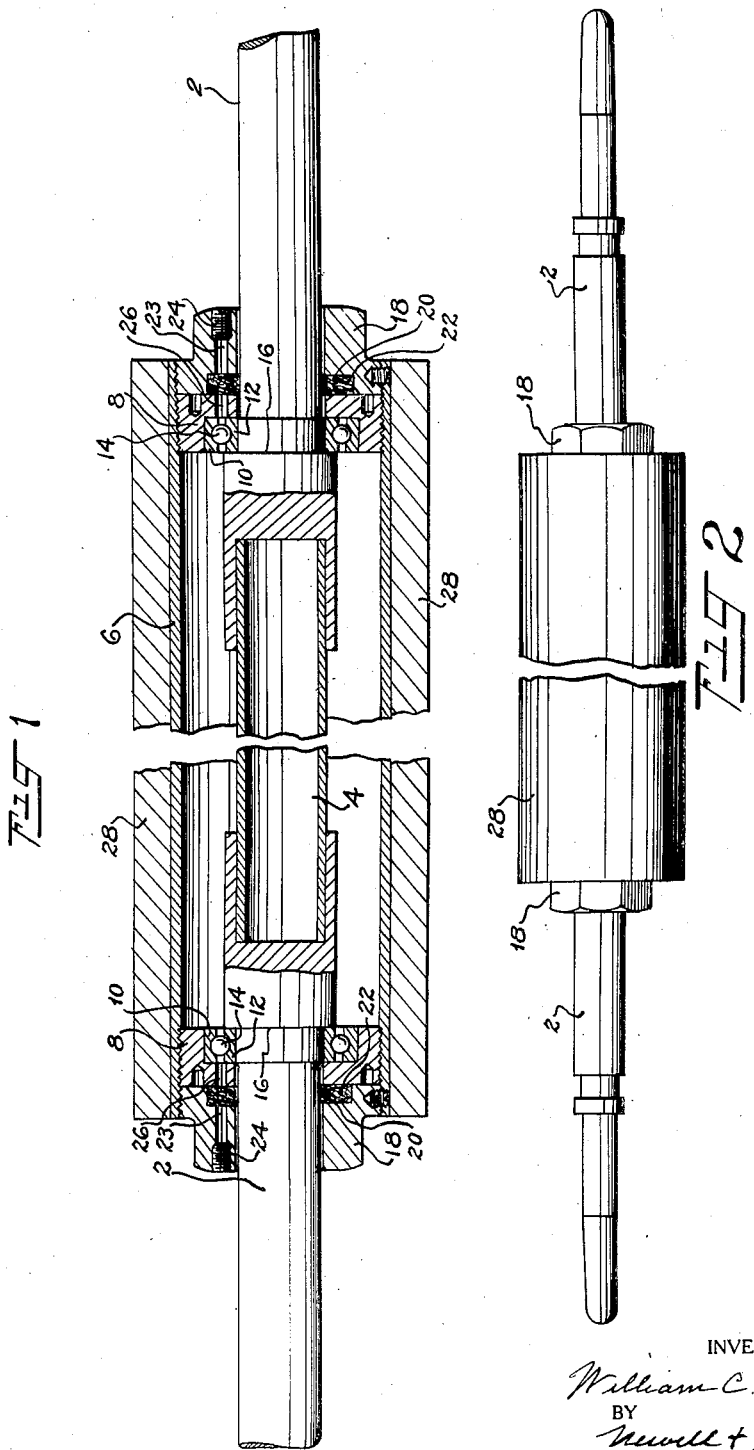

Patented Sept. 13, 1927.

1,642,068

UNITED STATES PATENT OFFICE.

WILLIAM C. HART, OF KEW GARDENS, NEW YORK.

PRINTING ROLLER.

Application filed February 26, 1924. Serial No. 695,167.

This invention relates to inking rollers for printing presses.

Inking rollers of the kind ordinarily employed upon printing presses comprise a central core or shaft, the projecting ends of which form the trunnions for the roller and a body of suitable composition surrounding this core. Rollers of this construction are comparatively heavy, running as high as 200 pounds in weight and usually are mounted in plain bearings. The ordinary printing press is usually provided with six to eight of these rollers. Thus the aggregate weight of these rollers is high and constitutes a heavy load upon the driving mechanism and a great deal of power is used up in rotating the same.

The principal object of the present invention is to produce an inking roller which is as efficient and reliable in operation as the rollers heretofore produced, in which the weight which revolves during the operation of the roller is greatly reduced.

With this object in view the invention consists in an inking roller embodying the novel and improved features hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In the drawings—

Figure 1 is a view in longitudinal section of an inking roller embodying the invention, and Figure 2 is a view illustrating the roller in elevation.

In the form of the invention illustrated in the drawings of this application, the roller comprises a central shaft or core upon which is mounted a hollow shell or cylinder and a peripheral covering, preferably made of the usual roller composition, surrounding and secured to this shell. The central core or shaft is adapted to remain stationary during the operation of the roller and the parts supported on the shaft are arranged to rotate with relation to the shaft. In the drawings the central core or shaft comprises two cylindrical bars 2 of substantially identical construction forming the end portions of the shaft and a section of pipe 4 forming the central portion of the shaft. The ends of the pipe 4 are inserted in counterbores in the bars 2 and are secured therein preferably by welding the same.

Rotatably mounted on the central core is a cylindrical hollow cylinder or shell indicated at 6. In order to support the shell on the shaft, collars 8 are threaded into the opposite ends of the shell and ball bearings are interposed between these collars and the shaft to enable the shell to turn on the shaft with a minimum of friction. In the construction shown in the drawings, the ball bearings comprise an outer bearing ring 10 set into a recess in the collar 8 and secured preferably by its tight fit, and an inner bearing ring 12 surrounding the corresponding bar 2 and similarly secured thereto and a series of balls 14 interposed between the two bearing rings. In order to hold the shell securely from endwise movement with relation to the central core, the end bars 2 of the core are provided with shoulders 16 against which the inner rings 12 of the ball bearings are set.

The collars 8 are securely held in position in the shell by means of outer collars 18 also threaded into the ends of the shell and engaging the inner collars 8, the collars 18 acting to lock the inner collars in position.

To enable the bearings for the roller to be kept well oiled, the collars 18 are each provided with a circular recess 20 forming an oil pocket in which is placed a circular felt ring 22. The collars 18 are each provided with a bore 23 through which oil is introduced to impregnate the felt ring 22, this bore being normally closed by a plug 24 threaded therein. The collars 8 are each provided with a bore 26 leading from the oil pocket 20 through which the oil passes to the ball bearings.

The peripheral portion of the roll indicated at 28 preferably consists of the composition usually employed in inking rollers, secured to the shell 6. This composition may be cast upon the shell or may be formed and secured to the shell in any other suitable manner.

In the above roller construction the central core or shaft, the weight of which consitutes a relatively large proportion of the weight of the roller, remains stationary during the operation of the printing press. This reduction in the weight of the rotating parts greatly reduces the amount of power required in driving the press and correspondingly reduces the cost of operation. That part of the roller which rotates is mounted on well oiled antifriction bearings, thus still further reducing the driving power required.

The felt ring 22 thoroughly filters the oil introduced through the bore 23 so that the oil is entirely free of dirt or other foreign material when it reaches the bearings.

When a solid shaft construction is employed the shaft will often buckle under the strains to which it is subjected during the operation of the roller. It is found that with the three piece shaft construction above described, the shaft is much stronger than a solid shaft and buckling of the shaft will be effectively prevented.

The pipe 4 also reduces the total weight of the roller.

The above roller construction enables the roller to be readily disassembled when it is desired to replace any of the parts which have become broken or excessively worn. In taking the roller apart the collars 18 and 8 at one end of the roller are unscrewed from the shell 6 and the shell may then be removed lengthwise from the opposite end of the shaft. The bearing rings 10 and 12 fit closely within the collars 8 and upon the shaft respectively, but are not sufficiently tight to prevent their ready disengagement from these parts in disassembling the roller.

The roller is also constructed to prevent the outer composition from penetrating within the shell or reaching the ball bearings when the composition is cast upon the shell. In casting the composition upon the shell, the shaft with the shell mounted thereon is placed in the mold and the composition is then forced into the mold about the parts of the roller. To prevent the composition from entering between the collars 18 and the shaft, a cloth is wound about the shaft against the outer end of each of the collars before the casting operation. After the roller is removed from the mold the composition is trimmed off at the outer ends of the shell.

In the ordinary roller construction the ends of the shaft are supported in plain bearings and the ends of the shafts and the bearings often become considerably worn by extended use. The wearing of these parts often causes the roller to operate unevenly, thereby damaging the composition covering of the roller. When the ends of the shaft become excessively worn it is often necessary to have new bearings made to fit the worn ends of the shaft. All of these disadvantages are obviated in the present roller construction.

It is to be understood that except as defined in the claims the invention is not limited to the particular construction of the illustrated embodiment of the invention but that the invention may be embodied in other forms within the scope of the claims.

Having explained the nature and object of the invention and having specifically described a construction embodying the invention in its preferred form, what is claimed is:

1. An inking roller having a central shaft comprising solid end portions and a central tubular portion secured at its ends within counterbores in said end portions, and a hollow cylindrical shell rotatably mounted on bearings carried by the solid end portions of the shaft.

2. An inking roller having a central shaft, a hollow cylindrical shell rotatably mounted on said shaft, a collar removably mounted in each end of the shell, an outer bearing ring removably fitted in a recess in said collar, an inner bearing ring removably mounted on the shaft, bearing balls interposed between said bearing rings, a second collar removably mounted in each end of the shell and engaging one of the first-mentioned collars to lock the same in position, the collars at each end of the roller being constructed to provide a recess between the same, a felt filler mounted in said recess, a duct in each of the first collars leading from the corresponding recess to the bearing, and a duct in each of the second collars for introducing oil into the recess.

3. An inking roller having a central shaft comprising solid end shaft portions and a central tubular portion secured at its ends to said solid end portions, a hollow cylindrical shell rotatably mounted on bearings carried by the solid end portions of the shaft, and means carried respectively by the solid end portions of the shaft and by the shell for preventing endwise movement of the shell on the shaft.

Signed at New York city, New York, this 19th day of February 1924.

WILLIAM C. HART.